(12) United States Patent
Lewis et al.

(10) Patent No.: US 7,388,045 B1
(45) Date of Patent: *Jun. 17, 2008

(54) CEMENT COMPOSITIONS COMPRISING LIGNITE GRAFTED FLUID LOSS CONTROL ADDITIVES

(75) Inventors: Sam Lewis, Duncan, OK (US); Jiten Chatterji, Duncan, OK (US); Bobby King, Duncan, OK (US); Chad Brennels, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/702,324

(22) Filed: Feb. 5, 2007

(51) Int. Cl.
*C04B 24/34* (2006.01)
*C04B 24/16* (2006.01)
*C04B 24/26* (2006.01)

(52) U.S. Cl. .............................. 524/5; 106/805; 166/293; 166/294; 166/295; 524/4

(58) Field of Classification Search .................. 106/805; 166/293–295; 524/4–5
See application file for complete search history.

(56) References Cited

U.S. PATENT DOCUMENTS

| | | | |
|---|---|---|---|
| 2,805,719 A | 9/1957 | Anderson | |
| 4,515,635 A | 5/1985 | Rao et al. | |
| 4,555,269 A | 11/1985 | Rao et al. | |
| 4,557,763 A | 12/1985 | George et al. | |
| 4,640,942 A | 2/1987 | Brothers | |
| 4,676,317 A | 6/1987 | Fry et al. | |
| 4,703,801 A | 11/1987 | Fry et al. | |
| 4,818,288 A | 4/1989 | Aignesburger et al. | |
| 4,938,803 A | 7/1990 | Huddleston | |
| 4,941,536 A | 7/1990 | Brothers et al. | |
| 5,028,271 A | 7/1991 | Huddleston | |
| 5,049,288 A | 9/1991 | Brothers et al. | |
| 5,134,215 A | 7/1992 | Huddleston et al. | |
| 5,147,964 A | 9/1992 | Huddleston et al. | |
| 5,149,370 A | 9/1992 | Olaussen et al. | |
| 5,339,903 A | 8/1994 | Eoff et al. | |
| 5,472,051 A | 12/1995 | Brothers | |
| 5,705,599 A * | 1/1998 | Felixberger et al. ......... 528/227 |
| 6,085,840 A | 7/2000 | Laramay et al. | |
| 6,089,318 A | 7/2000 | Laramay et al. | |
| 6,136,935 A * | 10/2000 | Udarbe et al. ............... 526/312 |
| 6,138,759 A | 10/2000 | Chatterji et al. | |
| 6,268,406 B1 | 7/2001 | Chatterji et al. | |
| 6,270,565 B1 | 8/2001 | Heathman et al. | |
| 6,405,801 B1 | 6/2002 | Vijn et al. | |
| 6,497,283 B1 | 12/2002 | Eoff et al. | |
| 6,562,122 B2 | 5/2003 | Dao et al. | |
| 6,715,552 B2 | 4/2004 | Eoff et al. | |
| 6,743,288 B2 | 6/2004 | Eoff et al. | |
| 6,767,867 B2 | 7/2004 | Chatterji et al. | |
| 6,770,604 B2 | 8/2004 | Reddy et al. | |
| 6,776,237 B2 | 8/2004 | Dao et al. | |
| 6,822,061 B2 | 11/2004 | Eoff et al. | |
| 6,953,090 B2 | 10/2005 | Vijn et al. | |
| 6,964,302 B2 | 11/2005 | Luke et al. | |
| 7,021,380 B2 | 4/2006 | Caveny | |
| 7,073,585 B2 | 7/2006 | Morgan et al. | |
| 7,077,203 B1 | 7/2006 | Roddy et al. | |
| 7,114,569 B2 | 10/2006 | Chatterji et al. | |
| 7,128,148 B2 | 10/2006 | Eoff et al. | |
| 7,199,086 B1 | 4/2007 | Roddy et al. | |
| 2003/0083204 A1 | 5/2003 | Chatterji et al. | |
| 2003/0181542 A1 | 9/2003 | Vijn et al. | |
| 2003/0230407 A1 | 12/2003 | Vijn et al. | |
| 2005/0034864 A1 | 2/2005 | Caveny et al. | |
| 2005/0038127 A1 | 2/2005 | Vijn et al. | |
| 2005/0121194 A1 | 6/2005 | Morgan et al. | |
| 2005/0124503 A1 | 6/2005 | Morgan et al. | |
| 2005/0204962 A1 | 9/2005 | Luke et al. | |

OTHER PUBLICATIONS

Office Action mailed Aug. 17, 2007 in U.S. Appl. No. 11/702,342.
Cementing Halad®-413 Fluid-Loss Additive Paper, Halliburton Fluid Systems, #H01503, Jan. 2006.
2005 Borregaard LignoTech found at http://www.lignotech.com/eway/default.aspx?pid=249&trg=MainPage_9490=9721:25010::0:9720:16:::0:0.
Halliburton Brochure entitled: "Fluid Loss Additive, Halad-413" dated Jan. 2006.
Halliburton Brochure entitled: "Fluid Loss Additives, Our Case for Halliburton Additives is Water Tight" dated 1994.
U.S. Appl. No. 11/652,215, filed Feb. 5, 2007, Lewis et al.
U.S. Appl. No. 11/652,346, filed Feb. 5, 2007, Lewis et al.
"Cementing CFR-3 Cement Friction Reducer" HO1325 Oct. 2005, Halliburton Communications.
"Halad-413 Fluid Loss Additive" HO1332 1998, Halliburton Communications.
"HR-5 Cement Additive" HO1335 1998, Halliburton Communications.
"HR-12 Cement Retarder" HO1476 1999, Halliburton Communications.
"Cementing HR-25 Cement Retarder" HO1479 May 2006, Halliburton Communications.
"MicroBond HT Cement Additives" HO1464 1999, Halliburton Communications.
"MicroBond M Cement Additive" HO1463 1999, Halliburton Communications.

(Continued)

Primary Examiner—Peter Szekely
(74) Attorney, Agent, or Firm—Craig W. Roddy; Baker Botts, LLP

(57) ABSTRACT

Novel well cement compositions are provided. Exemplary embodiments of the well cement compositions comprise water, a cement and a fluid loss control additive comprising a graft polymer. The graft polymer comprises a backbone comprising a lignite. The graft polymer further comprises grafted monomers selected from the group consisting of 2-acrylamido-2-methylpropanesulfonic acid, acrylamide, acrylic acid, vinylphosphonic acid, diallyldimethylammonium chloride and salts thereof.

14 Claims, No Drawings

OTHER PUBLICATIONS

"Cementing SCR-100 Cement Retarder" HO1480 May 2006, Halliburton Communications.

"Silicalite Cement Additive" HO1484 1999, Halliburton Communications.

"SSA-1 Strength-Stabilizing Agent" HO1340 1998, Halliburton Communications.

The Merck Index, An Excyclopedia of Chemicals, Drugs, and Biologicals, 11th Edition, 1989, p. 751.

Office action dated Mar. 18, 2008 from U.S. Appl. No. 11/652,215.

Notice of allowance dated Jan. 14, 2008 from U.S. Appl. No. 11/702,342.

Notice of allowance dated Dec. 3, 2007 from U.S. Appl. No. 11/702,342.

* cited by examiner

CEMENT COMPOSITIONS COMPRISING LIGNITE GRAFTED FLUID LOSS CONTROL ADDITIVES

CROSS-REFERENCE TO RELATED APPLICATIONS

This application is related to U.S. patent application Ser. No. 11/702,342, entitled "Method of Using Lignite-Grafted Fluid Loss Control Additives in Cementing Operations", filed on the same date herewith, the entire disclosure of which is incorporated herein by reference.

BACKGROUND

The present invention relates to cementing operations. More particularly, the present invention relates to the use of a graft polymer as a fluid loss control additive in cementing operations, the graft polymer comprising a lignite backbone and grafted monomers selected from the group consisting of 2-acrylamido-2-methylpropanesulfonic acid, acrylamide, acrylic acid, vinylphosphonic acid, diallyldimethylammonium chloride and salts thereof.

Well cement compositions are commonly utilized in subterranean operations, particularly subterranean well construction and remedial operations. For example, in subterranean well construction, a pipe string (e.g., casing and liners) may be run into a well bore and cemented in place. The process of cementing the pipe string in place is commonly referred to as "primary cementing." In a typical primary cementing operation, a cement composition may be pumped into an annulus between the walls of the well bore and the exterior surface of the pipe string disposed therein. The cement composition sets in the annular space, thereby forming an annular sheath of hardened, substantially impermeable cement that supports and positions the pipe string in the well bore and bonds the exterior surface of the pipe string to the subterranean formation. Among other things, the annular sheath of set cement surrounding the pipe string functions to prevent the migration of fluids in the annulus, as well as protecting the pipe string from corrosion. Cement compositions also may be used in plugging and abandonment operations and remedial cementing operations, such as squeeze cementing and the placement of cement plugs.

For such subterranean cementing operations to be successful, the cement compositions typically include a fluid loss control additive to reduce the loss of fluid, from the cement compositions, e.g., when they contact permeable subterranean formations and zones. Excessive fluid loss may cause, for example, a cement composition to become prematurely dehydrated, which limits the amount of the cement composition that can be pumped. Due to this premature dehydration, excessive pump pressure may be required to place the cement composition, potentially resulting in breakdown of the formation and/or destabilization of the well bore.

Certain polymers have been used heretofore as fluid loss control additives in cementing operations. For example, cellulosic materials such as hydroxyethyl cellulose and carboxymethylhydroxyethyl cellulose have been used as fluid loss control additives. Copolymers of 2-acrylamido-2-methylpropanesulfonic acid and acrylamide or N,N-dimethylacrylamide have also been used as fluid loss control additives. In addition, graft polymers comprising a backbone of lignin or lignite and pendant groups comprising at least one member selected from the group consisting of 2-acrylamido-2-methylpropanesulfonic acid, acrylonitrile and N,N-dimethylacrylamide have been used as fluid loss control additives. These fluid loss control additives, however, may not provide a desired level of fluid loss control at high temperatures (e.g., at least about 500° F. (260° C.)) and/or may be exhibit undesirable properties (e.g., dispersive).

SUMMARY

The present invention relates to cementing operations. More particularly, the present invention relates to the use of a graft polymer as a fluid loss control additive in cementing operations, the graft polymer comprising backbone of a lignite and grafted monomers selected from the group consisting of 2-acrylamido-2-methylpropanesulfonic acid, acrylamide, acrylic acid, vinylphosphonic acid, diallyldimethylammonium chloride and salts thereof.

An exemplary embodiment of the present invention provides a well cement composition. The well cement composition comprises water, a cement and a fluid loss control additive comprising a graft polymer. The graft polymer comprises a backbone comprising a lignite. The graft polymer further comprises a first grafted monomer selected from the group consisting of 2-acrylamido-2-methylpropanesulfonic acid, salts thereof and combinations thereof. The graft polymer further comprises a second grafted monomer comprising diallyldimethylammonium chloride.

An exemplary embodiment of the present invention provides a well cement composition. The well cement composition comprises water, a cement and a fluid loss control additive comprising a graft polymer. The graft polymer comprises a backbone comprising a lignite. The graft polymer further comprises a first grafted monomer selected from the group consisting of 2-acrylamido-2-methylpropanesulfonic acid, salts thereof and combinations thereof. The graft polymer further comprises a second grafted monomer selected from the group consisting of vinylphosphonic acid, salts thereof and combinations thereof.

Another exemplary embodiment of the present invention provides a well cement composition. The well cement composition comprises water, a hydraulic cement, and a fluid loss control additive comprising a graft polymer. The graft polymer comprises a backbone comprising a lignite. The graft polymer comprises a first grafted monomer selected from the group consisting of 2-acrylamido-2-methylpropanesulfonic acid, salts thereof and combinations thereof. The graft polymer further comprises a second grafted monomer comprising diallyldimethylammonium chloride. The graft polymer further comprises a third grafted monomer comprising acrylamide. The graft polymer further comprises a fourth grafted monomer selected from the group consisting of acrylic acid, vinylphosphonic acid, salts thereof and combinations thereof.

DESCRIPTION OF SPECIFIC EMBODIMENTS

The present invention relates to cementing operations. More particularly, the present invention relates to the use of a graft polymer as a fluid loss control additive in cementing operations, the graft polymer comprising a lignite backbone and grafted monomers selected from the group consisting of 2-acrylamido-2-methylpropanesulfonic acid (AMPS® acid), acrylamide, acrylic acid, vinylphosphonic acid (VPA), diallyldimethylammonium chloride (DADMAC) and salts thereof. While these graft polymers are effective at reducing fluid loss from cement compositions in a variety of cementing applications, they may be particularly useful for reducing fluid loss in high temperature applications, for example, in wells having a bottom hole circulating temperature (BHCT) of at least about 500° F. (260° C.).

An exemplary embodiment of the cement compositions of the present invention comprises water, cement and a fluid loss control additive comprising a graft polymer, the graft polymer comprising a backbone that comprises a lignite. The graft polymer further comprises grafted monomers selected from the group consisting of 2-acrylamido-2-methylpropanesulfonic acid (AMPS® acid), acrylamide, acrylic acid, vinylphosphonic acid (VPA), diallyldimethylammonium chloride (DADMAC) and salts thereof. For example, in one exemplary embodiment, the graft polymer may comprise a first grafted monomer selected from the group consisting of 2-acrylamido-2-methylpropanesulfonic acid, salts thereof and combinations thereof, and a second grafted monomer comprising diallyldimethylammonium chloride. In another exemplary embodiment, the graft polymer may comprise a first grafted monomer selected from the group consisting of 2-acrylamido-2-methylpropanesulfonic acid, salts thereof and combinations thereof, and a second grafted monomer selected from the group consisting of vinylphosphonic acid, salts thereof and combinations thereof. The graft polymer further may comprise additional grafted monomers, such as those listed above. In general, the grafted monomers may be present in one or more pendant groups attached to the lignite backbone in a random nature. By way of example, each pendant group attached to the lignite backbone may contain one or more of the monomers in a random nature.

Those of ordinary skill in the art will appreciate that the exemplary cement compositions generally should have a density suitable for a particular application. By way of example, exemplary embodiments of the cement compositions may have a density in the range of from about 8 pounds per gallon ("ppg") to about 21 ppg.

The water used in exemplary embodiments of the cement compositions of the present invention may be freshwater or saltwater (e.g., water containing one or more salts dissolved therein, seawater, brines, saturated saltwater, etc.). In general, the water may be present in an amount sufficient to form a pumpable slurry. In exemplary embodiments, the water may be present in the cement compositions in an amount in the range of from about 33% to about 200% by weight of the cement ("bwoc"). In exemplary embodiments, the water may be present in an amount in the range of from about 35% to about 70% bwoc.

Exemplary embodiments of the cement compositions of the present invention comprise a cement. Any of a variety of cements suitable for use in subterranean cementing operations may be used in accordance with exemplary embodiments of the present invention. Suitable examples include hydraulic cements that comprise calcium, aluminum, silicon, oxygen and/or sulfur, which set and harden by reaction with water. Such hydraulic cements, include, but are not limited to, Portland cements, pozzolana cements, gypsum cements, high alumina content cements, slag cements, silica cements and combinations thereof. In certain embodiments, the hydraulic cement may comprise a Portland cement. In some embodiments, the Portland cements that are suited for use in exemplary embodiments of the present invention are classified as Class A, C, H and G cements according to American Petroleum Institute, *API Specification for Materials and Testing for Well Cements*, API Specification 10, Fifth Ed., Jul. 1, 1990.

In addition, exemplary embodiments of the cement compositions of the present invention comprise a fluid loss control additive. As previously mentioned, such fluid loss control additives comprise a graft polymer that comprises a lignite backbone grafted with monomers selected from the group consisting of 2-acrylamido-2-methylpropanesulfonic acid (AMPS® acid), acrylamide, acrylic acid, vinylphosphonic acid (VPA), diallyldimethylammonium chloride (DADMAC), and salts thereof. In general, these graft polymers are effective at reducing fluid loss from cement compositions in a variety of cementing operations. By way of example, these graft polymers may be particularly suitable for use as fluid loss control additives in high temperature applications, for example, in wells with a BHCT of at least about 500° F. (260° C.).

Generally, the backbone of the graft polymer comprises a lignite. As used in this disclosure, the term "lignite" refers to a variety of low rank coals, including oxidized lignite (e.g., leonardite), mined lignin, brown coal or slack. In addition, in exemplary embodiments, the backbone may further comprise polyvinyl alcohol, polyethylene oxide, polypropylene oxide, polyethyleneimine and combinations thereof. Those of ordinary skill in the art will appreciate that the lignite may be treated with a caustic (for example, potassium hydroxide, sodium hydroxide or ammonium hydroxide) to solubilize the lignite in water. By way of example, treatment of the lignite with a caustic solution generally may dissolve or disperse a portion of the lignite into the solution. Such solution may then be concentrated to increase the lignite content or may be used directly in the polymerization.

The graft polymer may comprise a sufficient amount of the lignite backbone to provide a desirable level of fluid loss control. In exemplary embodiments, the backbone may be present in the graft polymer in an amount in the range of from about 5% to about 95% by weight of the graft polymer on a dry basis. In exemplary embodiments, the backbone may be present in the graft polymer in an amount in the range of from about 10% to about 50% by weight of the graft polymer on a dry basis. In exemplary embodiments, the backbone may be present in the graft polymer in an amount in the range of from about 10% to about 20% by weight of the graft polymer on a dry basis.

As previously mentioned, the lignite backbone of the graft polymer may be grafted with any combination of monomers selected from the group consisting of AMPS® acid, DADMAC, acrylamide, acrylic acid, VPA and salts thereof. In general, the grafted monomers may be present in pendant groups attached to the lignite backbone in a random nature. By way of example, each pendant group attached to the lignite backbone may contain one or more of the monomers in a random nature. It is believed that the various monomers (e.g., the AMPS® acid, acrylamide, acrylic acid, VPA and DADMAC) attach at free radicals created in the lignite backbone. In exemplary embodiments, the monomers selected from the group consisting of the AMPS® acid, acrylamide, acrylic acid, VPA, DADMAC and salts thereof may be admixed with the lignite prior to initiation of the polymerization reaction.

Generally, the graft polymer may comprise a sufficient amount of these grafted monomers to provide a desirable level of fluid loss control. In exemplary embodiments, the grafted monomers may be present in the graft polymer in an amount in the range of from about 5% to about 95% by weight of the graft polymer on a dry basis. In exemplary embodiments, the grafted monomers may be present in the graft polymer in an amount in the range of from about 50% to about 90% by weight of the graft polymer on a dry basis. In exemplary embodiments, the grafted monomers may be present in the graft polymer in an amount in the range of from about 80% to about 90% by weight of the graft polymer on a dry basis.

An exemplary fluid loss control additive comprises a lignite backbone grafted with a first monomer comprising AMPS® acid, salts thereof or combinations thereof, a second monomer comprising DADMAC, a third monomer comprising acrylamide and a fourth monomer comprising acrylic acid, salts thereof or combinations thereof. Each of these grafted monomers may be present in the exemplary graft polymer in a variety of different mole ratios. In an exemplary embodiment, the exemplary graft polymer may have a first grafted monomer-to-third grafted monomer mole ratio in the range of from about 1:1 to about 4:1. In an exemplary embodiment, the exemplary graft polymer may have a first grafted monomer-to-fourth grafted monomer mole ratio in the range of from about 1:1 to about 10:1. In an exemplary embodiment, the exemplary graft polymer may have a first grafted monomer-to-second grafted monomer mole ratio in the range of from about 1:1 to about 10:1. In an exemplary embodiment, the exemplary graft polymer may have a first grafted monomer-to-third grafted monomer-to-fourth grafted monomer-to-second grafted monomer mole ratio in the range of from about 4:3:2:1 to about 4:1:0.5:0.1. In another exemplary embodiment, the exemplary graft polymer may a first grafted monomer-to-third grafted monomer-to-fourth grafted monomer-to-second grafted monomer mole ratio in the range of from about 4:3:1:1 to about 4:2:1:0.25.

Another exemplary fluid loss control additive comprises a lignite backbone grafted with a first monomer comprising AMPS® acid, salts thereof or combinations thereof, a second monomer comprising DADMAC, a third monomer comprising acrylamide and a fourth monomer comprising VPA, salts thereof or combinations thereof. Each of these grafted monomers may be present in the exemplary graft polymer in a variety of different mole ratios. In an exemplary embodiment, the exemplary graft polymer may have a first grafted monomer-to-third grafted monomer mole ratio in the range of from about 1:1 to about 4:1. In an exemplary embodiment, the exemplary graft polymer may have a first grafted monomer-to-fourth grafted monomer salt mole ratio in the range of from about 2:1 to about 10:1. In an exemplary embodiment, the exemplary graft polymer may have a first grafted monomer-to-second grafted monomer mole ratio in the range of from about 1:1 to about 10:1. In an exemplary embodiment, the exemplary graft polymer may have a first grafted monomer-to-third grafted monomer-to-fourth grafted monomer-to-second grafted monomer mole ratio in the range of from about 4:4:1:2 to about 4:1:0.1:0.1. In another exemplary embodiment, the exemplary graft polymer may have a first grafted monomer-to-third grafted monomer-to-fourth grafted monomer-to-second grafted monomer mole ratio in the range of from about 4:4:1:2 to about 4:2:1:0.25.

Those of ordinary skill in the art will appreciate that the amount of each of the grafted monomers present in the graft polymer is dependent upon a number of factors, including cost, the temperature of use, the desired molecular weight of the graft polymer, dispersive properties and desired amount of fluid loss control, to name a few examples.

Those of ordinary skill in the art will appreciate that suitable graft polymers may be in an acid form or in a salt form. As will be appreciated, a variety of salts of the graft polymers may be prepared, for example, by neutralizing the acid form of the AMPS® acid, acrylic acid monomer and/or VPA monomer with an alkaline agent. By way of example, suitable alkaline agents may include sodium hydroxide, ammonium hydroxide or the like. This neutralization may occur, for example, either prior to or after the polymerization of the graft polymer. By way of example, a salt of AMPS® acid (such as the sodium salt of AMPS® acid) may be used in the polymerization of the graft polymer. In addition, neutralization of the monomers may occur, for example, due to calcium ions present in the exemplary cement compositions.

The fluid loss control additive should be included in exemplary embodiments of the cement compositions of the present invention in an amount sufficient to provide a desired level of fluid loss control. The fluid loss control additive may be present in exemplary embodiments of the cement compositions in an amount in the range of from about 0.1% to about 5% bwoc. The fluid loss control additive may be present in exemplary embodiments of the cement compositions in an amount in the range of from about 0.2% to about 3% bwoc.

Graft polymers used as fluid loss control additives in accordance with exemplary embodiments of the present invention may be prepared using any suitable polymerization technique. By way of example, suitable graft polymers may be prepared using any of a variety of free radical polymerization techniques. The initiators employed in these free radical techniques to produce exemplary embodiments of the graft polymer may generally comprise a redox initiator capable of generating a free radical in the lignite that will initiate polymerization by reacting with the monomers. While various ceric salts and other compounds may be suitable to effect the free radical initiation, an ammonium persulfate-sodium bisulfite redox system may be employed for the preparation of exemplary embodiments of the lignite graft polymers. In certain exemplary embodiments, water may be employed as the solvent in the polymerization reactions. Those of ordinary skill in the art, however, will appreciate that other solvents capable of solubilizing the reactants as desired also may be utilized.

Other additives suitable for use in subterranean cementing operations also may be added to exemplary embodiments of the cement compositions. Examples of such additives include dispersing agents, set retarding agents, accelerants, defoaming agents, lost circulation materials, salts, fly ash, fiber, strength retrogression additives, weighting agents, vitrified shale, lightweight additives (e.g., bentonite, gilsonite, glass spheres, etc.) and combinations thereof. A person having ordinary skill in the art, with the benefit of this disclosure, will readily be able to determine the type and amount of additive useful for a particular application and desired result.

As will be appreciated by those of ordinary skill in the art, exemplary embodiments of the cement compositions of the present invention may be used in a variety of subterranean applications, including primary and remedial cementing. Exemplary embodiments of the cement compositions may be introduced into a subterranean formation and allowed to set therein. Exemplary embodiments of the cement compositions may comprise water, cement and a fluid loss control additive comprising a graft polymer. The graft polymer comprising a lignite backbone. The graft polymer further comprises grafted monomers selected from the group consisting of 2-acrylamido-2-methylpropanesulfonic acid (AMPS® acid), acrylamide, acrylic acid, vinylphosphonic acid (VPA), diallyldimethylammonium chloride (DADMAC) and salts thereof. By way of example, in one exemplary embodiment, the graft polymer may comprise a first grafted monomer selected from the group consisting of 2-acrylamido-2-methylpropanesulfonic acid, salts thereof and combinations thereof, and a second grafted monomer comprising diallyldimethylammonium chloride. In another exemplary embodiment, the graft polymer may comprise a first grafted monomer selected from the group consisting of 2-acrylamido-2-methylpropanesulfonic acid, salts thereof and combinations thereof, and a second grafted monomer selected from the group consisting of vinylphosphonic acid, salts thereof and combinations thereof. By way of example, in exemplary primary cementing embodiments, a cement composition may be introduced into a space between a subterranean formation and a pipe string located in the subterranean formation. The cement composition may be allowed to set to form a hardened mass in the space between the subterranean formation and the pipe string. In addition, in exemplary remedial cementing embodiments, a cement composition may used, for example, in squeeze cementing operations or in the placement of cement plugs.

To facilitate a better understanding of the present technique, the following examples of some specific exemplary embodiments are given. In no way should the following examples be read to limit, or to define, the scope of the invention.

EXAMPLE 1

Graft polymers comprising a lignite backbone grafted with a salt of AMPS® acid, acrylamide, acrylic acid (or VPA) and DADMAC were prepared in accordance with the following procedure. First, a sodium salt of lignite, water, a defoamer and ethylenediaminetetraacetic acid (EDTA) were added to a reactor vessel. To this vessel, a 58% by weight solution of the sodium salt of AMPS® acid, a 48% by weight solution of acrylamide, acrylic acid (or VPA as set forth in the table below) and DADMAC were then added. This mixture was heated and held at a temperature of about 158° F. (70° C.) for one hour while purging with nitrogen. After one hour, ammonium persulfate was added to initiate polymerization. This mixture was held at a temperature of about 158° F. (70° C.) for two hours. After two hours, sodium metabisulfite was added, and the mixture was allowed to cool. When the mixture reached room temperature, a 50% solution of sodium hydroxide was added to adjust the pH in the range of from about 7 to about 8. The weight percent of each component utilized in the graft polymer's preparation is listed in the table below.

TABLE 1

| Component | Formulation #1 (% by wt) | Formulation #2 (% by wt) |
| --- | --- | --- |
| Sodium Salt of Lignite | 5.6 | 5.6 |
| Water | 40.67 | 38.36 |
| NaOH (50% solution) | 2.96 | 3.03 |
| Defoamer | 0.01 | 0.01 |
| NaAMPS (58% solution) | 31.48 | 31.48 |
| Acrylamide (48% solution) | 5.92 | 5.92 |
| Acrylic Acid | 1.44 | — |
| VPA | — | 1.08 |
| DADMAC (62% solution) | 5.22 | 7.82 |
| NaEDTA | 0.1 | 0.1 |

TABLE 1-continued

| Component | Formulation #1 (% by wt) | Formulation #2 (% by wt) |
| --- | --- | --- |
| Ammonium Persulfate (27% solution) | 3.3 | 3.3 |
| Sodium Metabisulfite (27% solution) | 3.3 | 3.3 |

EXAMPLE 2

The following series of tests were performed to compare the performance of exemplary embodiments of the fluid loss control additives of the present invention with HALAD®-413 fluid loss additive, which is described in U.S. Pat. No. 4,676,317, the disclosure of which is incorporated herein by reference. Accordingly, sample cement compositions were prepared that comprised Portland Class H cement, HR®-12 retarder (0.6% bwoc), a free water control additive (0.1% bwoc), a fluid loss control additive (1% bwoc) and sufficient water to provide a density of 16.4 ppg. HR®-12 retarder is a cement set retarder available from Halliburton Energy Services, Inc. In addition, the free water control additive used was hydroxyethyl cellulose, available from Halliburton Energy Services, Inc.

With respect to the fluid loss control additives, Sample No. 1 included HALAD®-413 fluid loss additive as the fluid loss control additive. Sample Nos. 2-9 comprised the exemplary embodiments of the fluid loss control additive of the present invention having a lignite concentration of between 12% to 16% by weight and mole ratios of the grafted monomers as set forth in the table below.

TABLE 2

| | Mole Ratio | | | | |
| --- | --- | --- | --- | --- | --- |
| Polymer | NaAMPS | Acrylamide | Acrylic Acid | VPA | DADMAC |
| Lignite Graft Polymer 1 | 0.4 | 0.2 | 0.1 | — | 0.1 |
| Lignite Graft Polymer 1A | 0.4 | 0.25 | 0.1 | — | 0.05 |
| Lignite Graft Polymer 1B | 0.4 | 0.275 | 0.1 | — | 0.025 |
| Lignite Graft Polymer 1C | 0.3 | 0.375 | 0.1 | — | 0.025 |
| Lignite Graft Polymer 2 | 0.4 | 0.2 | — | 0.05 | 0.15 |
| Lignite Graft Polymer 2A | 0.4 | 0.275 | — | 0.05 | 0.075 |
| Lignite Graft Polymer 2B | 0.4 | 0.3125 | — | 0.05 | 0.0375 |
| Lignite Graft Polymer 2C | 0.3 | 0.4125 | — | 0.05 | 0.0375 |

After preparation, each sample cement composition was poured into a pre-heated cell with a 325-mesh screen, and a fluid loss test was performed for 30 minutes at 1,000 psi and the temperature listed in the table below. The fluid loss tests were performed in accordance with API RP 10B, Recommended Practices for Testing Well Cements. Additionally, the rheological properties of the sample cement compositions were also determined using a Fann® Model 35 viscometer at the temperature listed in the table below, in accordance with the above-mentioned APP RP 10B. The results of these tests are given in the table below.

TABLE 3

| Sample No. | Density (ppg) | Fluid Loss Control Additive (1% bwoc) | Temp. (° F.) | Fluid Loss (cc/30 min.) | Rheology Tests: Viscometer Readings | | | | | | | |
|---|---|---|---|---|---|---|---|---|---|---|---|---|
| | | | | | 300 RPM | 200 RPM | 100 RPM | 60 RPM | 30 RPM | 6 RPM | 3 RPM | 600 RPM |
| 1 | 16.4 | HALAD®-413 | 80 | n/d | 300+ | 300+ | 250 | 172 | 101 | 29 | 16 | 300+ |
|   |      |            | 180 | 30  | 300+ | 232  | 127 | 80  | 43  | 10 | 5  | 300+ |
| 2 | 16.4 | Lignite Graft Polymer 1 | 80 | n/d | 300+ | 300+ | 265 | 182 | 108 | 31 | 18 | 300+ |
|   |      |                         | 180 | 24  | 300+ | 255  | 138 | 88  | 48  | 11 | 5  | 300+ |
| 3 | 16.4 | Lignite Graft Polymer 2 | 80 | n/d | 300+ | 300+ | 254 | 170 | 98 | 25 | 14 | 300+ |
|   |      |                         | 180 | 26  | 300+ | 232  | 122 | 75  | 39 | 8  | 4  | 300+ |
| 4 | 16.4 | Lignite Graft Polymer 1A | 80 | n/d | 300+ | 300+ | 190 | — | — | 51 | 10 | 300+ |
|   |      |                          | 180 | 30  | 212  | 148  | 80  | — | — | 16 | 3  | 300+ |
| 5 | 16.4 | Lignite Graft Polymer 2A | 80 | n/d | 300+ | 300+ | 173 | — | — | 31 | 8  | 300+ |
|   |      |                          | 180 | 18  | 197  | 137  | 76  | — | — | 25 | 3  | 300+ |
| 6 | 16.4 | Lignite Graft Polymer 1B | 80 | n/d | 300+ | 300+ | 234 | — | — | 38 | 12 | 300+ |
|   |      |                          | 180 | 30  | 241  | 169  | 93  | — | — | 23 | 3  | 300+ |
| 7 | 16.4 | Lignite Graft Polymer 2B | 80 | n/d | 300+ | 300+ | 211 | — | — | 44 | 10 | 300+ |
|   |      |                          | 180 | 20  | 230  | 160  | 85  | — | — | 21 | 3  | 300+ |
| 8 | 16.4 | Lignite Graft Polymer 1C | 80 | n/d | 300+ | 300+ | 259 | 175 | 103 | 29 | 16 | 300+ |
|   |      |                          | 180 | 28  | 300+ | 245  | 127 | 78  | 40  | 8  | 4  | 300+ |
| 9 | 16.4 | Lignite Graft Polymer 2C | 80 | n/d | 300+ | 300+ | 221 | — | — | 52 | 10 | 300+ |
|   |      |                          | 180 | 17  | 240  | 167  | 89  | — | — | 24 | 3  | 300+ |

Thus, Example 2 indicates, inter alia, that the use of exemplary embodiments of the fluid loss control additives of the present invention provides improved fluid loss control and more desirable rheology as compared to HALAD®-413 fluid loss additive.

EXAMPLE 3

Additional tests were performed to compare the performance of exemplary embodiments of the fluid loss control additives of the present invention with HALAD®-413 fluid loss additive at high temperatures. Accordingly, sample cement compositions were prepared that comprised Portland Class H cement, HR®-12 retarder, a free water control additive, SSA-1 strength stabilizing agent, a fluid loss control additive, and sufficient water to provide a density of 16.4 ppg. The free water control additive used was hydroxyethyl cellulose, available from Halliburton Energy Services, Inc. Sample No. 10 did not include the free water control additive. SSA-1 is a strength stabilizing agent (crystalline silica) available from Halliburton Energy Services, Inc. The specific fluid loss control additive included in each sample is set forth in the table below.

After preparation, fluid loss tests were performed at 1,000 psi and the temperature listed in the table below. For this series of tests, the fluid loss was determined using a stirring fluid loss apparatus rated for testing at temperatures up to 400° F. and pressures up to 2,000 psi. The stirring fluid loss apparatus is described in API RP10B-2/ISO 10426-2 in section 10. For these fluid loss tests, the sample was stirred in the test cell while the temperature was increased to the test temperature. After the sample reached the test temperature, rotation of the paddle inside the cell was stopped, the cell was rotated to place the sample against the filter medium (a 325-mesh sieve), and the fluid loss was determined. The filtrate from the sample flowed into a filtrate collection chamber that had back pressure applied to it in order to keep it from boiling for any tests containing salt. The results of these tests are given in the table below.

TABLE 4

| Sample No. | Density (ppg) | HR®-12 Retarder (% bwoc) | FWCA (% bwoc) | SSA-1 (% bwoc) | Fluid Loss Control Additive (1% bwoc) | Temp. (° F.) | Fluid Loss (cc/30 min.) |
|---|---|---|---|---|---|---|---|
| 10 | 16.4 | 0.6  | —   | 35 | Lignite Graft Polymer 2  | 250 | 42 |
| 11 | 16.4 | 1.5  | 0.1 | 35 | Lignite Graft Polymer 2  | 300 | 52 |
| 12 | 16.4 | 1.75 | 0.1 | 35 | Lignite Graft Polymer 1B | 350 | 60 |
| 13 | 16.4 | 1.75 | 0.1 | 35 | Lignite Graft Polymer 2B | 350 | 58 |
| 14 | 16.4 | 2    | 0.1 | 35 | HALAD®-413               | 400 | 82 |
| 15 | 16.4 | 2    | 0.1 | 35 | Lignite Graft Polymer 1B | 400 | 122 |
| 16 | 16.4 | 2    | 0.1 | 35 | Lignite Graft Polymer 2B | 400 | 175 |
| 17 | 16.4 | 2    | 0.1 | 35 | Lignite Graft Polymer 1C | 400 | 98 |
| 18 | 16.4 | 2    | 0.1 | 35 | Lignite Graft Polymer 2C | 400 | 183 |

Thus, Example 3 indicates, inter alia, that the use of exemplary embodiments of the fluid loss control additives of the present invention provides comparable fluid loss control as HALAD®-413 fluid loss additive.

EXAMPLE 4

Additional tests were performed to evaluate the performance of exemplary embodiments of the fluid loss control additives of the present invention. Accordingly, sample cement compositions were prepared that comprised Portland Class G cement, SSA-1 strength stabilizing agent (35% bwoc), HR®-5 retarder (0.3% bwoc), MICROBOND expanding additive (0.2% bwoc), a fluid loss control additive (1% bwoc), SILICALITE cement additive (10% bwoc), bentonite (2% bwoc) and sufficient water to provide a density of 15.2 ppg. HR®-5 retarder is a cement set retarder available from Halliburton Energy Services, Inc. MICROBOND expanding additive is a cement additive available from Halliburton Energy Services, Inc. SILICALITE cement additive is a finely divided, high surface area amorphous silica available from Halliburton Energy Services, Inc. The specific fluid loss control additive included in each sample is set forth in the table below.

After preparation, each sample cement composition was poured into a pre-heated cell with a 325-mesh screen, and a fluid loss test was performed for 30 minutes at 1,000 psi and the temperature listed in the table below. The fluid loss tests were performed in accordance with API RP 10B, Recommended Practices for Testing Well Cements. Additionally, the rheological properties of the sample cement compositions were also determined using a Fanny Model 35 viscometer at the temperature listed in the table below, in accordance with the above-mentioned APP RP 10B. The results of these tests are given in the table below.

retarder available from Halliburton Energy Services, Inc. The specific fluid loss control additive included in each sample is set forth in the table below.

After preparation, each sample cement composition was poured into a pre-heated cell with a 325-mesh screen, and a fluid loss test was performed for 30 minutes at 1,000 psi and the temperature listed in the table below. The fluid loss tests were performed in accordance with API RP 10B, Recommended Practices for Testing Well Cements. The results of these tests are given in the table below.

TABLE 6

| Sample No. | Density (ppg) | Fluid Loss Control Additive (1% bwoc) | Temp. (° F.) | Howco Consistometer Reading 0 min | Howco Consistometer Reading 20 min | Fluid Loss (cc/30 min.) |
|---|---|---|---|---|---|---|
| 21 | 17.5 | HALAD ®-413 | 180 | 18 | 14 | 100 |
| 22 | 17.5 | Lignite Graft Polymer 2B | 180 | 27 | 18 | 50 |

Thus, Example 5 indicates, inter alia, that the use of exemplary embodiments of the fluid loss control additives of the present invention provides improved fluid loss control as compared to HALAD®-413 fluid loss additive.

EXAMPLE 6

Compressive strength and thickening time tests were performed to compare the performance of sample cement compositions that comprised exemplary embodiments of the fluid loss control additives of the present invention with HALAD®-413 fluid loss additive. Accordingly, sample cement compositions were prepared that comprised Portland

TABLE 5

| Sample No. | Density (ppg) | Fluid Loss Control Additive (1% bwoc) | Temp. (° F.) | Fluid Loss (cc/30 min.) | Rheology Tests: Viscometer Readings 300 RPM | 200 RPM | 100 RPM | 60 RPM | 30 RPM | 6 RPM | 3 RPM | 600 RPM |
|---|---|---|---|---|---|---|---|---|---|---|---|---|
| 19 | 15.2 | Lignite Graft Polymer 1B | 80 | n/d | 128 | 95 | 56 | 38 | 24 | 9 | 6 | 224 |
|  |  |  | 180 | 68 | 125 | 89 | 51 | 34 | 20 | 7 | 4 | 215 |
| 20 | 15.2 | Lignite Graft Polymer 2B | 80 | n/d | 101 | 73 | 41 | 28 | 17 | 5 | 3 | 182 |
|  |  |  | 180 | 72 | 145 | 105 | 61 | 42 | 26 | 10 | 8 | 203 |

Thus, Example 4 indicates, inter alia, that the use of exemplary embodiments of the fluid loss control additives of the present invention may provide desirable fluid loss control and rheology.

EXAMPLE 5

Additional tests were performed to evaluate the performance of exemplary embodiments of the fluid loss control additives of the present invention. Accordingly, sample cement compositions were prepared that comprised Portland Class H cement, SSA-1 strength stabilizing agent (35% bwoc), SCR®-100 retarder (0.25% bwoc), HR®-25 retarder (0.1% bwoc), a fluid loss control additive (1% bwoc) and sufficient water to provide a density of 17.5 ppg. HR®-25 retarder is a cement set retarder available from Halliburton Energy Services, Inc. SCR®-100 retarder is a cement set Class H cement, SSA-1 strength stabilizing agent (35% bwoc), a free water control additive (0.1% bwoc), HR®-12 retarder, a fluid loss control additive (1% bwoc) and sufficient water to provide a density of 16.4 ppg. HR®-12 retarder was included in Sample Nos. 23-25 in an amount of 0.6% bwoc and in Samples Nos. 26-28 in an amount of 2% bwoc. The free water control additive used was hydroxyethyl cellulose, available from Halliburton Energy Services, Inc. The specific fluid loss control additive included in each sample is set forth in the table below.

After preparation, the sample cement compositions were subjected to 48-hour compressive strength tests and thickening time tests at the temperature listed in the table below, in accordance with API RP10B, Recommended Practices for Testing Well Cements. The results of these tests are set forth in the table below.

TABLE 7

| Sample No. | Density (ppg) | HR ®-12 Retarder (% bwoc) | Fluid Loss Control Additive (1% bwoc) | Temp. (° F.) | Thickening Time to 70 BC (Hr:Min) | Comp. Strength (psi) |
|---|---|---|---|---|---|---|
| 23 | 16.4 | 0.6 | HALAD ®-413 | 250 | 6:46 | 3,963 |
| 24 | 16.4 | 0.6 | Lignite Graft Polymer 1B | 250 | 6:57 | 3,750 |
| 25 | 16.4 | 0.6 | Lignite Graft Polymer 2B | 250 | 6:58 | 3,243 |
| 26 | 16.4 | 2.0 | HALAD ®-413 | 325 | 4:46 | n/d |
| 27 | 16.4 | 2.0 | Lignite Graft Polymer 1B | 325 | 3:35 | n/d |
| 28 | 16.4 | 2.0 | Lignite Graft Polymer 2B | 325 | 2:17 | n/d |

Thus, Example 6 indicates, inter alia, that the use of exemplary embodiments of the fluid loss control additives of the present invention may provide desirable thickening times and compressive strengths.

The particular embodiments disclosed above are illustrative only, as the present invention may be susceptible to various modifications and alternative forms. However, it should be understood that the invention is not intended to be limited to the particular embodiments disclosed. Rather, the present invention is to cover all modifications, equivalents and alternatives falling within the scope and spirit of the present invention as defined by the following appended claims.

What is claimed is:

1. A well cement composition comprising:
   water;
   a cement; and
   a fluid loss control additive comprising a graft polymer, the graft polymer comprising:
   a backbone comprising a lignite;
   a first grafted monomer selected from the group consisting of 2-acrylamido-2-methylpropanesulfonic acid, salts thereof and combinations thereof;
   a second grafted monomer comprising diallyldimethylammonium chloride;
   a third grafted monomer comprising acrylamide; and
   a fourth grafted monomer selected from the group consisting of vinylphosphonic acid, salts thereof and combinations thereof,
   wherein the graft polymer has a first grafted monomer-second grafted monomer-third grafted monomer-fourth grafted monomer mole ratio in the range of from about 4:2:4:1 to about 4:0.1:1:0.1.

2. The well cement composition of claim 1, wherein the water is present in an amount in the range of from about 35% to about 70% by weight of the cement.

3. The well cement composition of claim 1, wherein the water is selected from the group consisting of freshwater and saltwater.

4. The well cement composition of claim 1, wherein the cement comprises a hydraulic cement.

5. The well cement composition of claim 1, wherein the cement comprises a hydraulic cement selected from the group consisting of a Portland cement, a pozzolana cement, a gypsum cement, a high alumina content cement, a slag cement, a silica cement and combinations thereof.

6. The well cement composition of claim 1, wherein the graft polymer comprises the backbone in an amount in the range of from about 10% to about 50% by weight of the graft polymer on a dry basis.

7. The well cement composition of claim 1, wherein the backbone comprises at least one monomer selected from the group consisting of polyvinyl alcohol, polyethylene oxide, polypropylene oxide, polyethyleneimine and combinations thereof.

8. The well cement composition of claim 1, wherein the lignite comprise a sodium salt of the lignite.

9. The well cement composition of claim 1, wherein the first grafted monomer, the second grafted monomer, the third grafted monomer and the fourth grafted monomer are individually present in one or more pendant groups of the graft polymer, wherein each of the one or more pendant groups comprise at least one member selected from the group consisting of the first grafted monomer, the second grafted monomer, the third grafted monomer, the fourth grafted monomer and combinations thereof.

10. The well cement composition of claim 1, wherein the well cement composition comprises an additive selected from the group consisting of a dispersing agent, a set retarding agent, an accelerant, a defoaming agent, a lost circulation material, a salt, fly ash, fiber, a strength retrogression additive, crystalline silica, a weighting agent, vitrified shale, a lightweight additive and combinations thereof.

11. A well cement composition comprising:
    water;
    a hydraulic cement; and
    a fluid loss control additive comprising a graft polymer, the graft polymer comprising:
    a backbone comprising a lignite;
    a first grafted monomer selected from the group consisting of 2-acrylamido-2-methylpropanesulfonic acid, salts thereof and combinations thereof;
    a second grafted monomer comprising diallyldimethylammonium chloride
    a third grafted monomer comprising acrylamide; and
    a fourth grafted monomer selected from the group consisting of vinylphosphonic acid, acrylic acid, salts thereof and combinations thereof,
    wherein the graft polymer has a first grafted monomer-second grafted monomer-third grafted monomer-fourth grafted monomer mole ratio in the range of from about 4:2:4:1 to about 4:0.1:1:0.1.

12. The well cement composition of claim 11, wherein the graft polymer comprises the backbone in an amount in the range of from about 10% to about 50% by weight of the graft polymer on a dry basis.

13. The well cement composition of claim 1 wherein the backbone is a lignite backbone.

14. The well cement composition of claim 11 wherein the backbone is a lignite backbone.

* * * * *

UNITED STATES PATENT AND TRADEMARK OFFICE
CERTIFICATE OF CORRECTION

PATENT NO. : 7,388,045 B1  Page 1 of 1
APPLICATION NO. : 11/702324
DATED : June 17, 2008
INVENTOR(S) : Lewis et al.

It is certified that error appears in the above-identified patent and that said Letters Patent is hereby corrected as shown below:

On the title page Item (75)
The name of inventor "Chad Brennels" should read --Chad Brenneis--.

Signed and Sealed this

Second Day of September, 2008

JON W. DUDAS
*Director of the United States Patent and Trademark Office*